United States Patent [19]

Nelimarkka

[11] 4,174,090

[45] Nov. 13, 1979

[54] BALL VALVE WITH SPINDLE, HAVING PARALLELEPIPED-BEARING BLOCK JOINT PORTIONS

[76] Inventor: Juha A. E. Nelimarkka, Marjalahdentie 8, 00930 Helsinki 93, Finland

[21] Appl. No.: 855,333

[22] Filed: Nov. 28, 1977

[30] Foreign Application Priority Data

Dec. 28, 1976 [FI] Finland .................................. 763719

[51] Int. Cl.² .......................... F16K 25/00; F16K 5/06
[52] U.S. Cl. ........................................ 251/86; 251/88; 251/172; 251/315
[58] Field of Search .................... 251/84, 86, 161, 162, 251/163, 315, 316, 317, 88, 172

[56] References Cited

U.S. PATENT DOCUMENTS

| | | | |
|---|---|---|---|
| 2,456,403 | 12/1948 | Goehring | 251/86 |
| 2,596,409 | 5/1952 | Johnson et al. | 251/86 |
| 2,751,185 | 6/1956 | Shand | 251/315 |
| 3,390,861 | 7/1968 | Masheder | 251/315 |
| 3,414,232 | 12/1968 | Hellman | 251/86 |
| 3,473,554 | 10/1969 | King | 251/315 |
| 3,698,687 | 10/1972 | Kitamura | 251/317 |
| 3,705,707 | 12/1972 | Scaramucci | 251/316 |

FOREIGN PATENT DOCUMENTS

| | | | |
|---|---|---|---|
| 444772 | 3/1927 | Fed. Rep. of Germany | 251/163 |
| 511844 | 11/1930 | Fed. Rep. of Germany | 251/163 |
| 1170734 | 5/1964 | Fed. Rep. of Germany | . |
| 2063684 | 7/1972 | Fed. Rep. of Germany | . |
| 1104872 | 11/1955 | France | 251/162 |

Primary Examiner—Martin P. Schwadron
Assistant Examiner—G. L. Walton
Attorney, Agent, or Firm—Cushman, Darby & Cushman

[57] ABSTRACT

A high pressure ball valve, the ball valve being tiltable under pressure into tight sealing engagement with a sealing ring at the outlet of the valve body. A joint is formed between the spindle and the ball to allow the tilting action of the ball, while still providing low-torque turning of the spindle. A parallelepiped-shaped joint portion is formed on the bottom of the spindle and is loosely received between two bearing blocks on the ball valve so that small amount of loss motion is provided between the spindle and ball valve.

5 Claims, 4 Drawing Figures

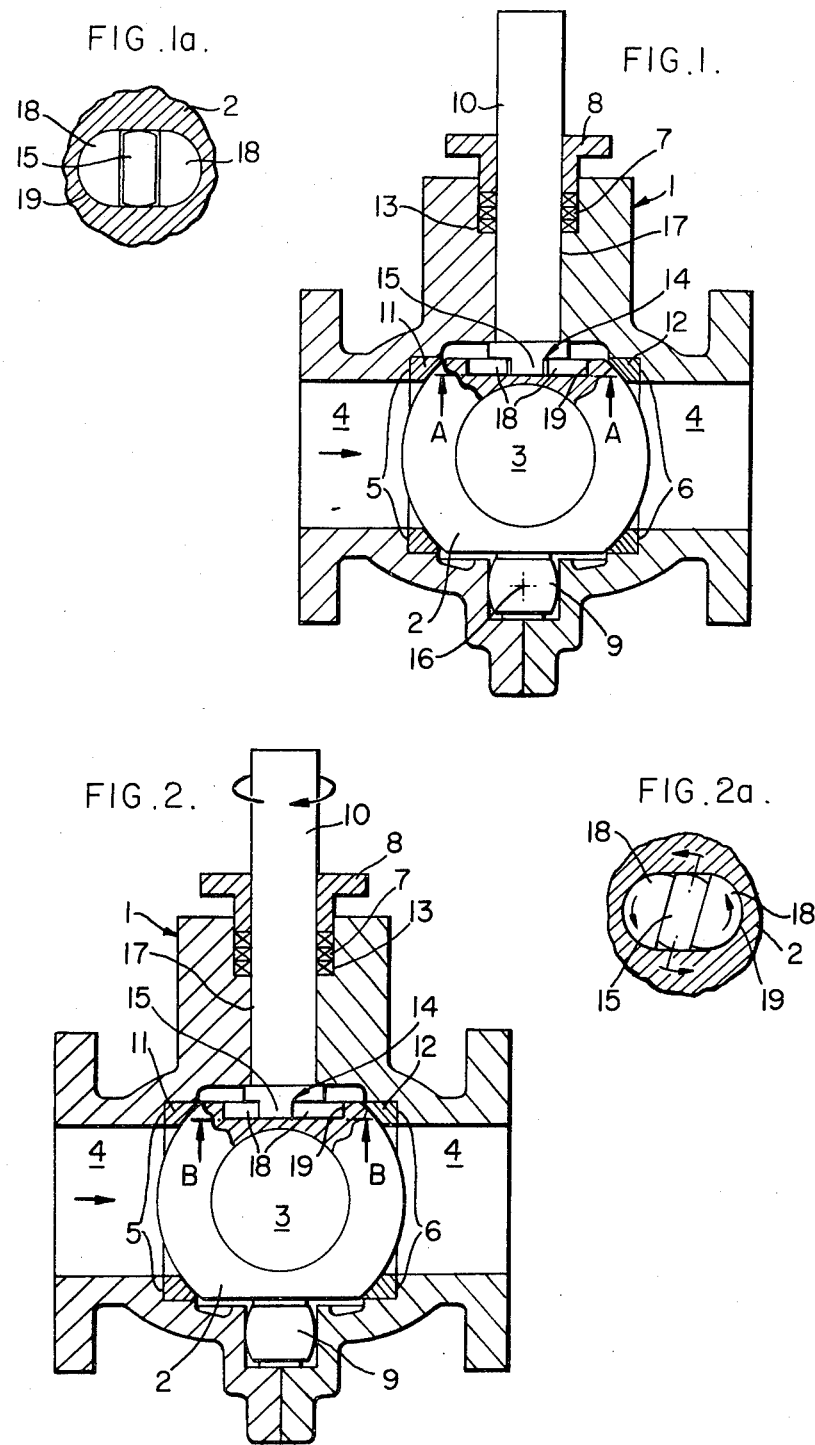

BALL VALVE WITH SPINDLE, HAVING PARALLELEPIPED-BEARING BLOCK JOINT PORTIONS

BACKGROUND AND SUMMARY OF THE INVENTION

The object of this invention is a ball valve comprising a body provided with a flow channel, an essentially ball-shaped or ball-segment shaped closing organ turnably arranged in the valve body, which closing organ is provided with spindles on both sides and which spindles are mounted on both sides of the closing organ perpendicular to the longitudinal axis of the flow passage, and of which spindles one spindle is brought through the wall of the valve to the outside of the valve with the aid of a socket provided with a sealing, such as box sealing, as well as sealing rings fitted into ring-shaped and transversal grooves made in the valve body preferably on both sides of the closing organ.

The purpose of the invention is to accomplish a valve which is simpler than corresponding previous valve constructions and particularly suited for high pressures, for instance 25 MPa or considerably above that, and if needed suited also for high temperatures, said valve possessing good sealing efficiency but which nevertheless can be regulated at a relatively low torque and therefore by means of a quite small working mechanism.

The main characteristic feature of the valve according to the invention is that a joint is formed between the closing organ and the regulating spindle, so that a parallelepiped-shaped joint portion is formed on the end of the regulating spindle, and bearing blocks in the part of the closing organ facing the regulating spindle, on both sides of the mentioned joint portion of the regulating spindle, are arranged or mounted to turn about axles parallel with the regulating spindle, at which the surfaces of the mentioned bearing blocks facing each other are planes, and that a clearance exists between the joint portion of the regulating spindle and the mentioned bearing blocks in such way that it is widest when the joint portion is in a position parallel with the bore of the closing organ, and becomes smaller and finally disappears when the direction of the joint portion of the regulating spindle is made to deviate in relation to the closing organ in either direction of turning, at which the joint between the regulating spindle and the closing organ permits tipping known as such of the closing organ under the action of the pressure medium on the closing organ against the sealing ring at the leaving end of the valve, in relation to the bearing point of the spindle situated on the opposite side of the closing organ and permitting the mentioned movement, and at which in turning the regulating spindle it turns in the first phase in relation to the closing organ accomplishing turning of the closing organ from tipping position towards a position where both spindles are at right angles to the longitudinal axis of the valve flow passage, and upon which in turning the regulating spindle further in the same direction, the closing organ can be turned at a lower torque to desired position.

BRIEF DESCRIPTION OF THE DRAWINGS

The invention is further explained below and in the enclosed drawing, in which

FIG. 1 presents a longitudinal section of a ball valve according to the invention taken at the spindle and the flow passage, in which valve the pipe pressure causes the closing organ to tip against the sealing at the leaving end of the valve, FIG. 1a present a section taken at A—A in FIG. 1 of the joint between the regulating spindle and the closing organ, FIG. 2 presents the valve in FIG. 1 when the closing organ is inclined or turned from tipped position to position of regulation, and FIG. 2a presents a section taken at B—B in FIG. 2 of the joint between the regulating spindle and the closing organ.

DETAILED DESCRIPTION OF THE DRAWINGS

The valve according to FIGS. 1 and 2 comprises a valve body 1 and a valve closing organ 2 shaped as a ball segment and provided with a bore or a channel 3 of the same diameter as that of the circular flow passage 4 situated in the valve body 1 on both sides of the closing organ 2. In FIGS. 1 and 2 the valve 1 is in closed position and the mentioned bore or channel 3 is situated crosswise in relation to the flow passage 4.

Joined to the closing organ 2 is an integral spindle 9 extending downwards and a separate longer spindle 10 extending upwards. The spindle 9 is mounted in a corresponding hollow in the valve body, and the spindle 10 in a corresponding bore 17 in the upper part of the valve body.

In the body 1 on both sides of the closing organ 2 ring-shaped grooves 5 and 6 running crosswise in relation to the flow passage 4 are fitted with sealing rings 11 and 12 preferably of metal.

In order to enable the pressure difference prevailing in the pipe system when the valve is closed, to push the closing organ 2 against the sealing ring 11 or 12 located on the leaving side, the closing organ 2 is able to turn about the point 16 due to the pressure difference, for instance a little towards the right in FIG. 1.

To this end the circular cross-section of the spindle 9 becomes smaller upwards and downwards from center to form a bearing surface of convex shape as shown in the drawing.

A sealing construction for passage of the spindle 10 is joined to the body portion of the valve by means of a so-called box sealing 7. By pressing the encased sealing socket 8 into the body portion 13 of the sealing construction with the aid of bolts, or the like, (not shown in the drawing), the sealing 7 situated around the spindle 10 pushes against the body portion 13.

In accordance with the invention a joint 14 is formed between the closing organ 2 and the regulating spindle 10, so that a parallelepiped-shaped joint portion 15 is formed on the end of the regulating spindle 10, and bearing blocks 18 in the part of the closing organ 2 facing the regulating spindle 10, on both sides of the joint portion 15 of the regulating spindle 10, are arranged or mounted to turn about axles parallel with the regulating spindle 10, at which the surfaces of the bearing blocks facing each other are planes. The bearing blocks 18 are fitted into circular hollows made in the closing organ 2, which preferably over their entire width are united to a single oval-shaped hollow 19. Seen in the direction of the regulating spindle 10 the bearing blocks 18 are preferably shaped as a circle segment smaller than a semi circle. Between the joint portion 15 of the regulating spindle 10 and the mentioned bearing blocks 18 a clearance exists in such a way that this is widest when the joint portion 15 is in a position parallel with the bore 3 of the closing organ 2, and becomes smaller and finally disappears when the direction of the joint portion of the regulating spindle 10 is made to deviate in relation to the closing organ 2 in either direction of turning. From the construction described above follows that the joint 14 between the regulating spindle 10 and the closing organ 2 permits tipping known as such of the closing organ 2 under the action of the pressure of the pressure medium on the closing organ 2 against the sealing ring 11 or 12 at the leaving end of the valve, in relation to the bearing point of the spindle 9 situated on the opposite side of the closing organ 2 and permitting the mentioned movement.

In opening the valve the closing organ is turned 90° about its vertical axis or the spindles 9 and 10, at which the bore 3 will have the direction of the flow passage 4.

In the valve construction according to this invention, however, a function is accomplished in the turning movement of the regulating valve 10 as a consequence of the above described joint 14, where in turning the regulating spindle 10 it turns in the first phase in relation to the closing organ 2 accomplishing turning of the closing organ 2 from tipping position towards a position where both spindles 9 and 10 are at right angles to the longitudinal axis of the flow passage 4 of the valve. In turning the regulating spindle 10 in the same direction further, the closing organ 2 can be turned at a lower torque to desired position.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

I claim:
1. A ball valve comprising
a body provided with a flow channel;
a generally ball-shaped rigid closing organ;
sealing rings fitted into ring-shaped and transverse grooves in the valve body on both sides of said closing organ;
a pair of spindles associated with said closing organ and provided extending from opposite sides thereof for receipt by said body, and mounting said organ so that the pressure of fluid on said organ tips said organ into sealing engagement against a said sealing ring; and
means for actuating said organ to rotate it with respect to said body to effect opening and closing of said flow channel, said means including one of said spindles extending through said body to the exterior thereof through a sealing mechanism, said one spindle having a joint portion at a first end thereof; a pair of bearing blocks provided on a side of said organ adjacent to said one spindle, said bearing blocks straddling said one spindle joint portion and being spaced from each other and with respect to the dimensions of said joint portion so that a clearance is provided between said joint portion and said bearing blocks sufficient to allow tipping of said organ into sealing engagement with a said sealing ring under the influence of fluid pressure; and means for mounting said one spindle with respect to said bearing blocks so that low-torque turning of said organ is effected by initial rotation of said one spindle so that said joint portion engages said bearing blocks and moves said organ out of tipping engagement with a said sealing ring, and so that continued rotation of said one spindle effects rotation of said organ to a desired position.

2. Valve according to patent claim 1, characterized in that the bearing blocks are fitted into circular grooves formed in the closing organ, which are connected together over their entire width.

3. Valve according to patent claim 2, characterized in that the bearing blocks have the shape of a circle segment seen in the direction of the regulating spindle.

4. Valve according to patent claim 3, characterized in that seen in the direction of the regulating spindle the circle-segment shaped bearing blocks are of semi-circular size of below that.

5. A valve according to claim 1, characterized in that the bearing blocks have the shape of a circle segment seen in the direction of the regulating spindle.

* * * * *